(12) United States Patent
Sharpe

(10) Patent No.: US 7,513,519 B2
(45) Date of Patent: Apr. 7, 2009

(54) FOOTWEAR CLEANING APPARATUS ADAPTED FOR ADJUSTABLE ATTACHMENT TO VEHICLE RUNNING BOARDS AND STEPS

(76) Inventor: David L. Sharpe, 234 Florida St., St. Simons Island, GA (US) 31522

( * ) Notice: Subject to any disclaimer, the term of this patent is extended or adjusted under 35 U.S.C. 154(b) by 271 days.

(21) Appl. No.: 11/552,143

(22) Filed: Oct. 23, 2006

(65) Prior Publication Data
US 2008/0092318 A1    Apr. 24, 2008

(51) Int. Cl.
*A47L 23/22* (2006.01)
(52) U.S. Cl. ............... 280/163; 280/164.2; 280/169
(58) Field of Classification Search ........... 280/163, 280/164.1, 164.2, 166, 169; 15/112, 161, 15/215, 216
See application file for complete search history.

(56) References Cited

U.S. PATENT DOCUMENTS

| | | | | |
|---|---|---|---|---|
| 2,857,173 A | * | 10/1958 | Benander | 280/164.2 |
| 3,747,150 A | * | 7/1973 | Kozub | 15/105 |
| 3,783,471 A | * | 1/1974 | McGeary et al. | 15/215 |
| D272,430 S | * | 1/1984 | Minichillo et al. | D12/203 |
| 5,067,196 A | * | 11/1991 | Chen | 15/238 |
| 5,310,201 A | * | 5/1994 | Routh | 280/164.2 |
| D364,597 S | * | 11/1995 | Branch | D12/203 |
| D397,979 S | * | 9/1998 | Graneto, III | D12/203 |
| 6,301,739 B1 | * | 10/2001 | Cazaux | 15/161 |
| 6,363,567 B1 | * | 4/2002 | Woodward | 15/161 |
| 6,898,817 B1 | * | 5/2005 | Jackson | 15/112 |
| 6,912,754 B2 | * | 7/2005 | Kunkle et al. | 15/161 |
| 7,114,212 B1 | * | 10/2006 | Watts | 15/36 |
| 7,363,677 B1 | * | 4/2008 | Owens | 15/161 |

* cited by examiner

*Primary Examiner*—Christopher P Ellis
*Assistant Examiner*—Brian Swenson
(74) *Attorney, Agent, or Firm*—Mark Young, P.A.

(57) ABSTRACT

An adjustable footwear cleaning apparatus includes a rectangular base, a plurality of spikes protruding from a surface of the base, a carpet that is sized to fit on the base and is perforated to allow the free ends of the spikes to protrude when the carpet is installed, and a mechanism for attaching the apparatus to a running board. The mechanism may include a plurality of straps or horizontally or vertically adjustable clamps adapted to adjustably secure the base to a vehicle step or running board.

13 Claims, 8 Drawing Sheets

Dimensions in mm

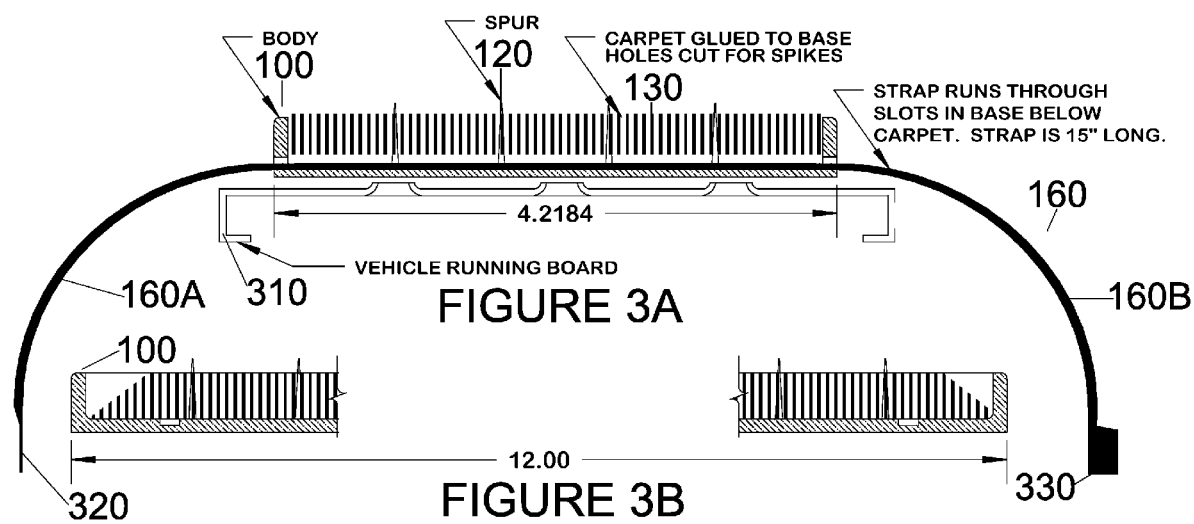

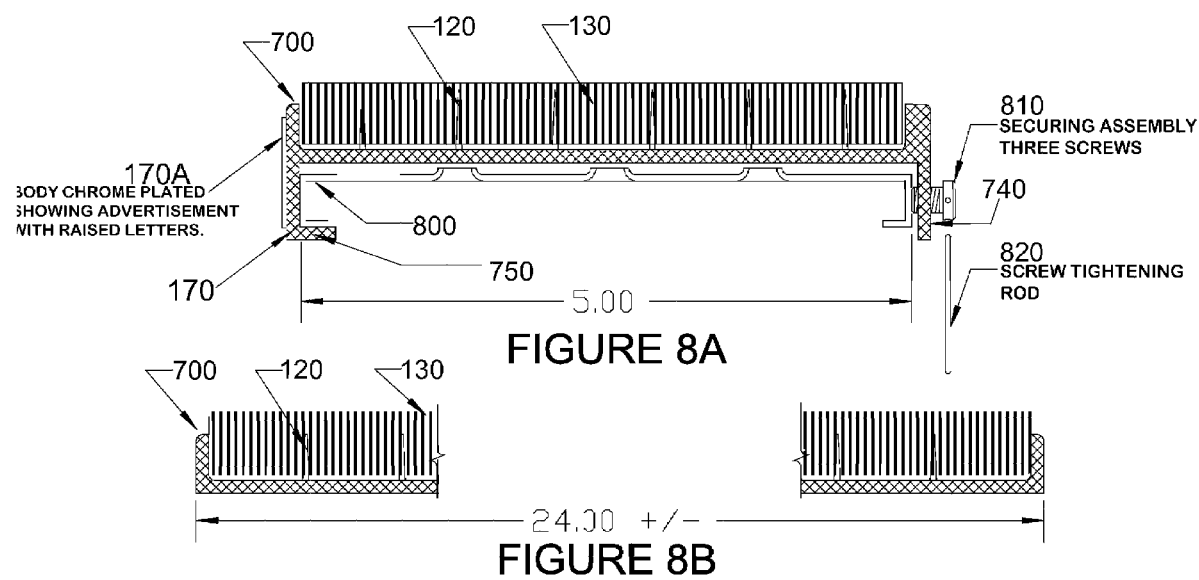

FOOTWEAR CLEANING APPARATUS ADAPTED FOR ADJUSTABLE ATTACHMENT TO VEHICLE RUNNING BOARDS AND STEPS

FIELD OF THE INVENTION

This invention generally relates to footwear cleaning devices, and more particularly, to a footwear cleaning apparatus adapted for adjustable attachment to a substrate such as a vehicle running board or step.

BACKGROUND

Truck drivers frequently traverse dirty areas to work, engage in recreational activities, load and unload cargo, and perform other tasks. During such activities, a driver's footwear may become soiled, and unless adequately cleaned, will begrime the interior of a vehicle.

Brushes and other devices for cleaning the bottoms of footwear of drivers and their passengers are known, particularly for use on early twentieth century automobiles equipped with running boards. Such devices typically feature brushes bolted to running boards, as shown in U.S. Pat. No. 1,212,111 to Roos. As modern passenger vehicles abandoned running boards, such cleaning devices vanished. Nevertheless, the problem of soiling vehicle interiors with mud and debris remains, and is particularly acute with trucks and sport utility vehicles, which are more costly and stylish than ever before.

Despite the increasing cost of motor vehicles and an attendant desire to keep them clean, the prior art cleaning apparatuses are not well adapted for use on modern vehicles. One deficiency common to such devices is that they cannot be easily removed, cleaned, and replaced. Another deficiency is that initial installation is difficult and entails penetrating the vehicle structure to bolt on the device. Yet another deficiency is that prior art devices typically provide limited cleaning surfaces that are not suitable for removal of hard, impregnated debris as well as fine dirt, mud and grime. A more versatile device that is adapted for use on modern vehicles, can be readily removed, cleaned and replaced, and is easy to install without damaging the vehicle, is needed.

The invention is directed to overcoming one or more of the problems and solving one or more of the needs as set forth above.

SUMMARY OF THE INVENTION

To solve one or more of the problems set forth above, in an exemplary implementation of the invention, an adjustable footwear cleaning apparatus includes a rectangular base, a plurality of spikes protruding from a surface of the base, a carpet that is sized to fit on the base and is perforated to allow the free ends of the spikes to protrude when the carpet is installed, and a plurality of straps adapted to adjustably secure the base to a substrate such as a vehicle step or running board.

In one aspect of the invention, an adjustable footwear cleaning apparatus includes a planar base having a top surface, a plurality of spikes having free ends protruding from the top surface of the base and a carpet sized to fit on the base and attached to the base. The free ends of the plurality of spikes protrude through the carpet. Means for attaching the base to a substrate is also provided. The substrate may be a running board of a vehicle or a step. Optionally, the carpet may include a plurality of perforations to allow passage of the free ends of the spikes.

Various types of attachment means may be utilized. In one embodiment, the means for attaching the base to a substrate comprise a plurality of straps adapted to adjustably secure the base to the substrate. The apparatus may include a plurality channels in the base adapted to receive segments of the straps. The straps may have hook and loop fastening elements. Alternatively, the straps may be pull ties. In another embodiment, the means for attaching the base to a substrate comprise horizontally or vertically adjustable clamps In another aspect of the invention, indicia is displayed on at least one raised edge. The inidicia may serve informational, ornamental and/or advertising purposes.

The base may be comprised of various types of materials, such as aluminum, magnesium, steel, aluminum alloys, magnesium alloys or steel alloys. Alternatively, the base may be comprised of a plastic material, such as polyvinyl chloride, polyethylene, polypropylene, polystyrene, acrylic, cellulosics, acrylonitrile-butadiene-styrene terpolymers, a urethane, thermo-plastic resins, a thermo-plastic elastomer, an acetal resin, a polyamide, a polycarbonate or a polyester. If the base is comprised of a plastic material, the material may further include an effective amount of an additive such as a thermochromic agent, a photochromic agent or a phosphorescent agent, in an amount effective to impart visible thermochromic, photochromic or phosphorescent properties to the base.

BRIEF DESCRIPTION OF THE DRAWINGS

The foregoing and other aspects, objects, features and advantages of the invention will become better understood with reference to the following description, appended claims, and accompanying drawings, where:

FIGS. 3A and 3B provide section views to conceptually illustrate an assembled adjustable footwear cleaning apparatus according to principles of the invention, with dimensions in inches; FIGS. 8A and 8B conceptually illustrate a base of an adjustable footwear cleaning apparatus with horizontal screw assemblies for securing the apparatus according to principles of the invention, with dimensions in inches.

Those skilled in the art will appreciate that Figures are not intended to be drawn to any particular scale; the invention is not limited to the dimensions or proportions shown in Figures; and the Figures are not intended to illustrate every embodiment of the invention. The invention is not limited to the exemplary embodiments depicted in the Figures or the shapes, relative sizes, ornamental aspects, dimensions or proportions shown in the Figures.

DETAILED DESCRIPTION

Figure 1:
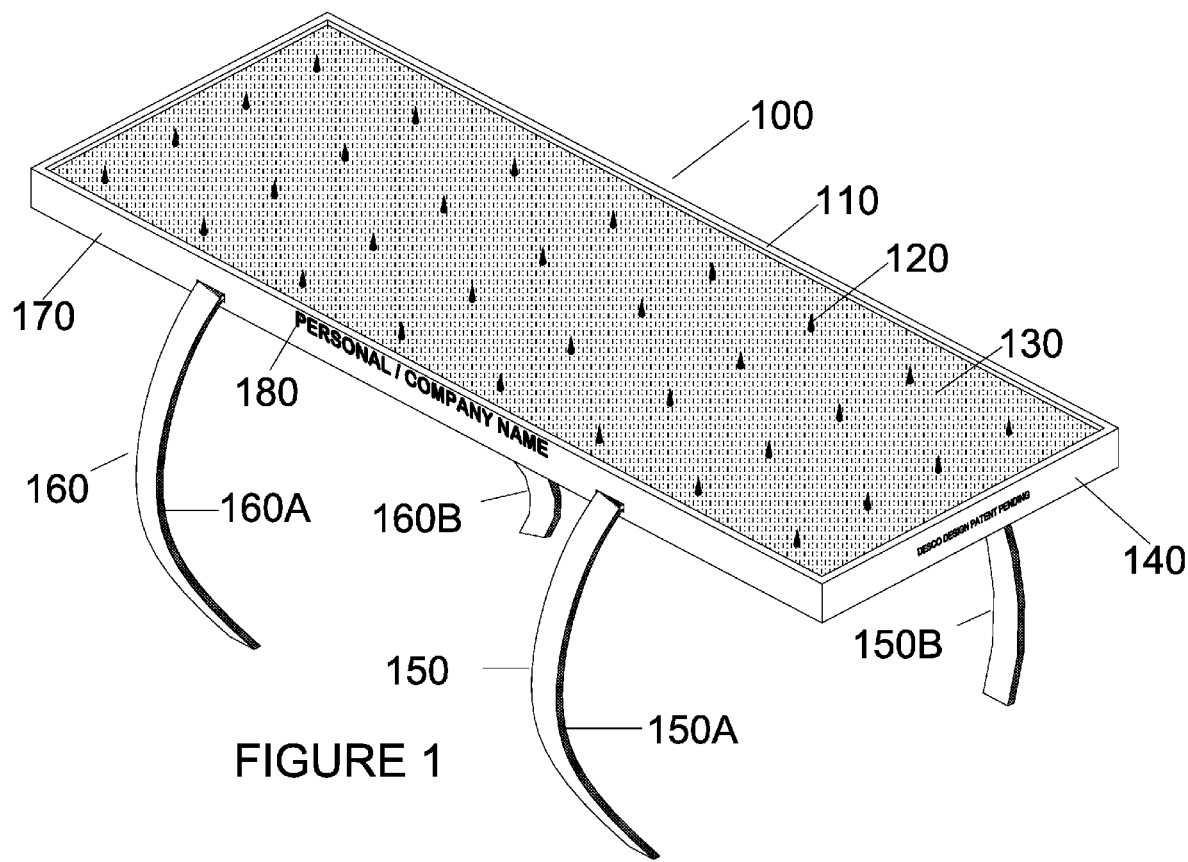
FIG. 1 conceptually illustrates an assembled adjustable footwear cleaning apparatus according to principles of the invention.

In an exemplary implementation of the invention, an adjustable footwear cleaning apparatus according to principles of the invention includes a rectangular base 100, a plurality of spikes 120 protruding from a surface of the base 100, a carpet 130 that is sized to fit on the base 100 and is perforated to allow the free ends of the spikes 120 to protrude when the carpet 130 is installed, and a plurality of straps 150, 160 adapted to adjustably secure the base 100 to a substrate such as vehicle step or running board, as conceptually illustrated in FIG. 1.

Figures 2A, 2B:
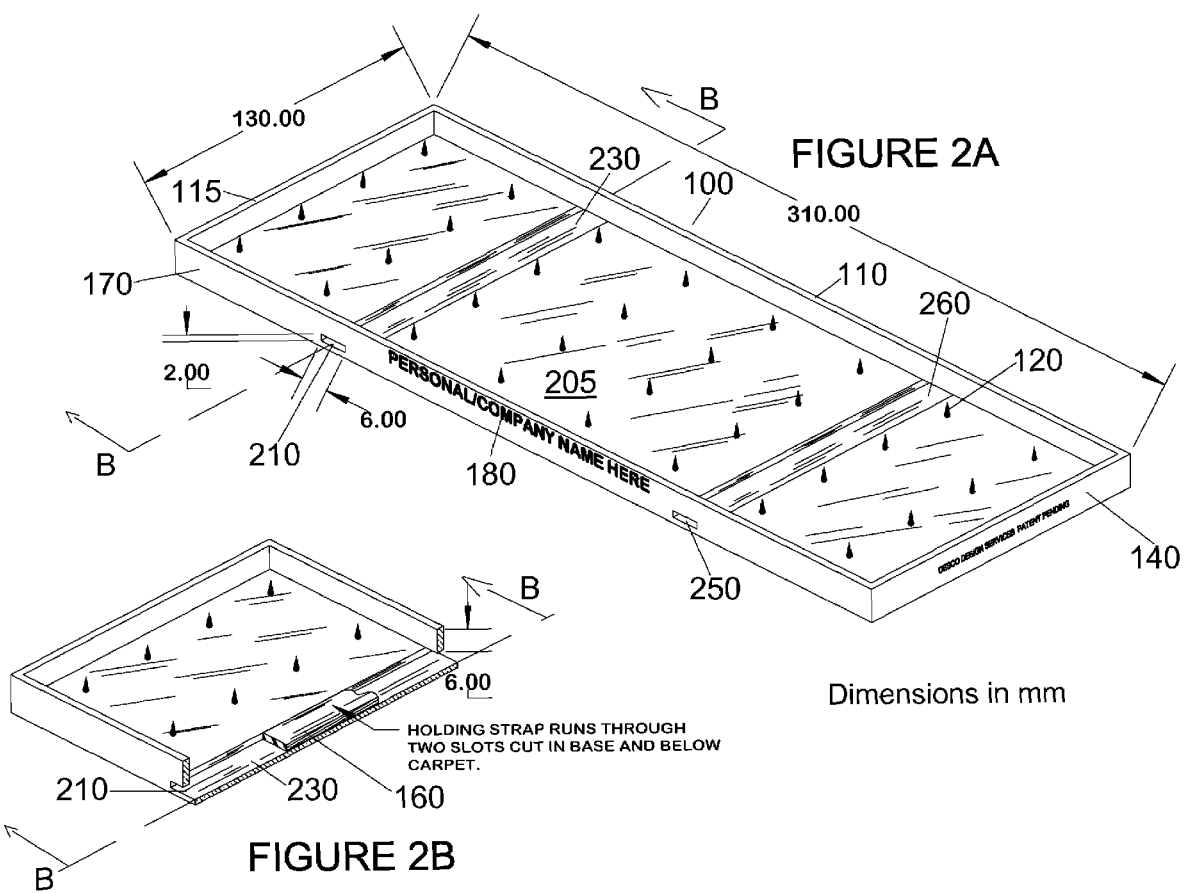
FIGS. 2A and 2B conceptually illustrate a base of an adjustable footwear cleaning apparatus according to principles of the invention, with dimensions in mm.

Referring now to FIG. 2A, the base 100 may be comprised of a rectangular tray with a rectangular planar bottom surface 205 and four raised edges 110, 115, 140 and 170. The rectangular planar bottom surface 205 and raised edges 110, 115, 140 and 170 form a compartment for receiving the carpet 130. The base 100 should have a size effective for cleaning footwear. While the invention is not limited to any particular size, in one exemplary implementation a width of approximately 5 inches by a length of approximately 12 inches, as conceptually shown in FIGS. 3A and 3B, respectively, may be utilized.

Referring again to FIG. 2A, a plurality of spikes 120 protrude from the planar bottom surface 205 of the base 100. While slender pointed spikes 120 are shown, the spikes 120 may have any elongated shape that is suitable for brushing, scraping or prying debris from the bottom of footwear. Thus, for example, the free ends of spikes may be pointed, flat, rounded, or some other configuration suitable for footwear cleaning. The number and arrangement of spikes may also vary, without departing from the scope of the invention. While thirty-two spikes are shown, evenly distributed along the length of the base in eight columns, with four spikes per column, the invention is not limited to this configuration. Instead, a different number of spikes (greater or less than 32), and a different arrangement and distribution of spikes may be utilized without departing from the scope of the invention, so long as at least a portion of the apparatus includes a plurality of spikes.

The spikes 120 may be an integral part of the planar bottom surface 205 of the base 100, or separate components attached to the planar bottom surface 205 of the base 100. Suitable attachments may include mechanical attachments (e.g., threaded attachments or rivets), chemical bonding or adhesives, thermal bonding or any other means of attachment suitable for securing the spikes to the planar bottom surface 205 of the base 100. Additionally, the spikes 120 may be permanently or releasably attached, within the scope of the invention. While releasable attachments may increase manufacturing costs, they would allow replacement of broken or damaged spikes.

As shown in FIGS. 2A and 2B, slots 210, 250 are provided to receive holding straps 150, 160. The slots 210, 250 are sized to allow passage of the straps 150, 160 through sides 110, 170. Shallow channels 230, 260 extend from each slotted side 110, 170, perpendicular thereto, to allow the received portions of the straps 150, 160, to rest therein. Thus, the received portions of the straps do not create a bump in the carpet.

Indicia 180 may be displayed along one or more raised edges 110, 115, 140 and 170 of the base 100. By way of example and not limitation, the visibly exposed side of a raised edge may display information, decorative features or promotional icons 180. Thus, the device may provide a unique informational and/or advertising means. For example, in a mode of advertising use, businesses may display their trademarks or service marks along one or more raised edges 110, 115, 140 and 170 and distribute the devices in accordance with an exemplary implementation of an exemplary embodiment of the invention to their customers (or potential customers), such as in giveaways as part of a promotional campaign. In using the device, consumers would display the trademarks or service marks for all individuals in the vicinity to view. Given the uniqueness of the device and the mode of use, it is believed that the device will draw considerable attention. In heavy traffic settings this could translate into exposure to hundreds or thousands of potential consumers. At televised events, the exposure can be significantly greater.

The base 110 may be comprised of various materials, such as metal and/or plastic. By way of example and not limitation, aluminum, magnesium, steel, alloys thereof or other metallic materials conventionally used for manufacturing vehicle components may be utilized. Such materials may be plated, coated or otherwise finished to provide a decorative, aesthetic pleasing and/or corrosion resistant finish for the apparatus.

In another exemplary implementation, the base 110 is comprised of a rigid plastic or polymeric material, such as polyvinyl chloride (PVC), polyethylene, polypropylene, polystyrene, acrylics, cellulosics, acrylonitrile-butadiene-styrene terpolymers, urethanes, thermo-plastic resins, thermo-plastic elastomers (TPE), acetal resins, polyamides, polycarbonates and polyesters. While many other materials may be used alone or in combination with the aforementioned materials and/or other materials, without departing from the scope of the present invention, preferably the material is relatively inexpensive, easy to use in manufacturing operations and results in an aesthetically acceptable, durable, weather resistant product. The material may further include additives to provide desired properties such as desired colors, structural characteristics, glow-in-the dark properties and thermal reactivity (e.g., color changes according to heat).

By way of example and not limitation, a plastic base 110 may optionally be formulated to change color when it reaches a predetermined or higher temperature. This can be accomplished by mixing a thermochromic additive to the base material in an amount that is sufficient to achieve a desired color changing range. As an example, a mixture of approximately 5% to 30% (pbw) of Matsui International Co., Inc.'s Chromicolor® concentrate may be introduced to plastic base material, to provide a plastic structure that visibly changes color at a determined elevated temperature, such as approximately 90 degrees Fahrenheit or higher.

Alternatively, a photochromic additive may be added to a plastic base material in an amount that is effective to achieve a desired color change when the base 100 is exposed to certain lighting conditions. As an example, a mixture of approximately 5% to 35% (pbw) of Matsui International Co., Inc.'s Photopia® additive may be introduced to plastic base material, to provide a plastic structure that visibly changes color in the presence of sunlight or ultraviolet light.

As another alternative, phosphorescent polymer additives, such as aluminate based phosphors, may be added to adsorb light energy and continue to release that energy as visible light after the energy source is removed. Advantageously, such an embodiment provides a base that is easy to locate in darkened conditions, making the vehicle easy to spot even at nighttime.

The base 100 may be produced using any suitable manufacturing techniques known in the art for the chosen material, such as (for example) milling, casting, stamping and machining in the case of a metal base, and injection, compression, structural foam, blow, or transfer molding; polyurethane foam processing techniques; vacuum forming; and casting, in the case of a plastic base. Preferably, the manufacturing technique is suitable for mass production at relatively low cost per unit, and results in an aesthetically acceptable product with a consistent acceptable quality.

The base 100 is preferably sufficiently strong and weather resistant such that it does not structurally fail from the stresses and environmental conditions encountered during use. Within these parameters, the base 100 may be either rigid or somewhat flexible. Illustratively, certain embodiments of the invention may utilize a base 100 that is formulated to exhibit flexibility and resiliency such that the base 100 can conform somewhat to the contours of footwear and return to its original shape without appreciable permanent deformation during normal use. Alternatively, the a base 100 may feature a formulation that exhibits rigidity such that the base 100 resists substantial deformation during normal use.

In use, the apparatus is a placed on a running board or step 310. Then straps 150, 160 are wrapped around the running board or step 310 and the free ends 320, 330 of the straps 150, 160 are secured.

Figure 4A:
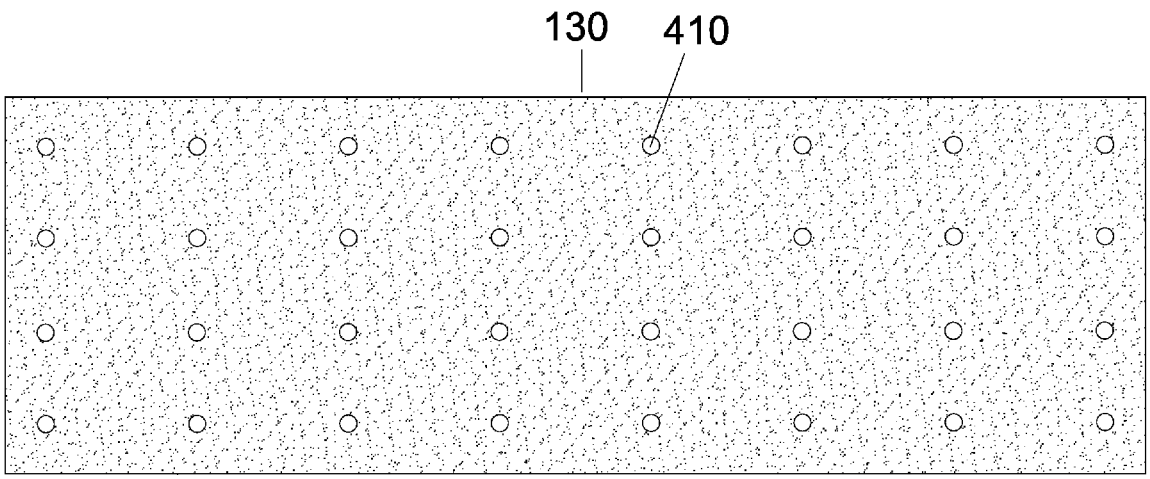
FIGS. 4A and 4B conceptually illustrate a perforated carpet layer of an adjustable footwear cleaning apparatus according to principles of the invention.
Figure 4B:
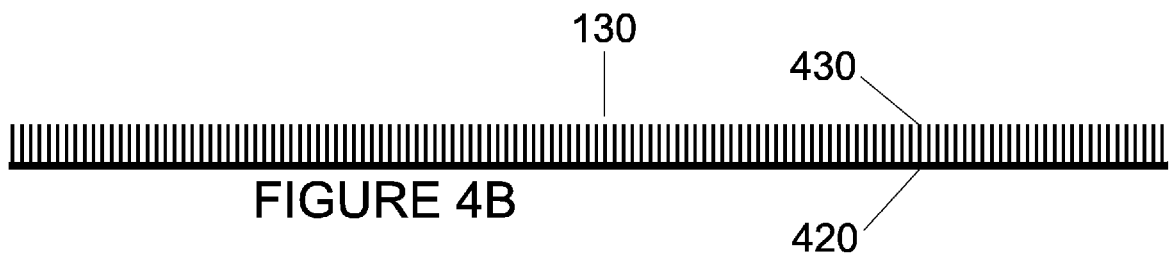

Referring now to FIGS. 4A and 4B, the carpet 130 is comprised of a weather resistant carpet material such as indoor-outdoor carpet. The carpet is sized to fit on the planar surface 205 of the base 100, within the space defined by the side edges 110, 115, 140 and 170. In an exemplary implementation, the carpet includes a backing surface 420 (e.g., a polymeric or fabric backing surface) with a nap layer 430 projecting therefrom. The carpet may include a plurality of pre-formed perforations 410 to allow passage of the free ends of spikes 120. Alternatively, the carpet 130 without the perforations 410 may be pressed onto the base 110, such that the spikes 120 pierce the carpet 130 during installation. An adhesive that will resist the conditions of outdoor use and adhere the backing 420 to the planar surface 205 of the base 100 may be used to secure the carpet in place.

The invention is not limited to an apparatus with straps. Instead, various attachment means for securing the apparatus to a running board or step may be utilized within the scope of the invention. Such attachment means may include straps, clamps and the like. In a preferred implementation, the attachment means does not damage the running board or step, is easy to apply and release and provides a strong weatherproof means of attachment.

In one embodiment, a plurality of attachment straps 150, 160 having free ends 150A, 150B, 160A, 160B are included to provide a means for adjustably attaching the base to a structure, such as running boards or steps of a vehicle. The straps 150, 160 may be fabricated from a strong, yet flexible material such as commercially-available nylon or nylon braid. In one exemplary implementation, a hook and loop fastening system is provided to releasably and adjustably secure engaging strap ends. In another implementation, the straps are comprised of pull ties (a/k/a cable ties) of sufficient length to adjustably secure the base to a structure. Advantageously, pull ties may be cut to remove the device and readily replaced. Other releasable and/or adjustable fastening systems, such as snaps, buckles and the like, may be used in lieu of hook and loop fasteners and pull ties, within the scope of the invention.

Figure 5:
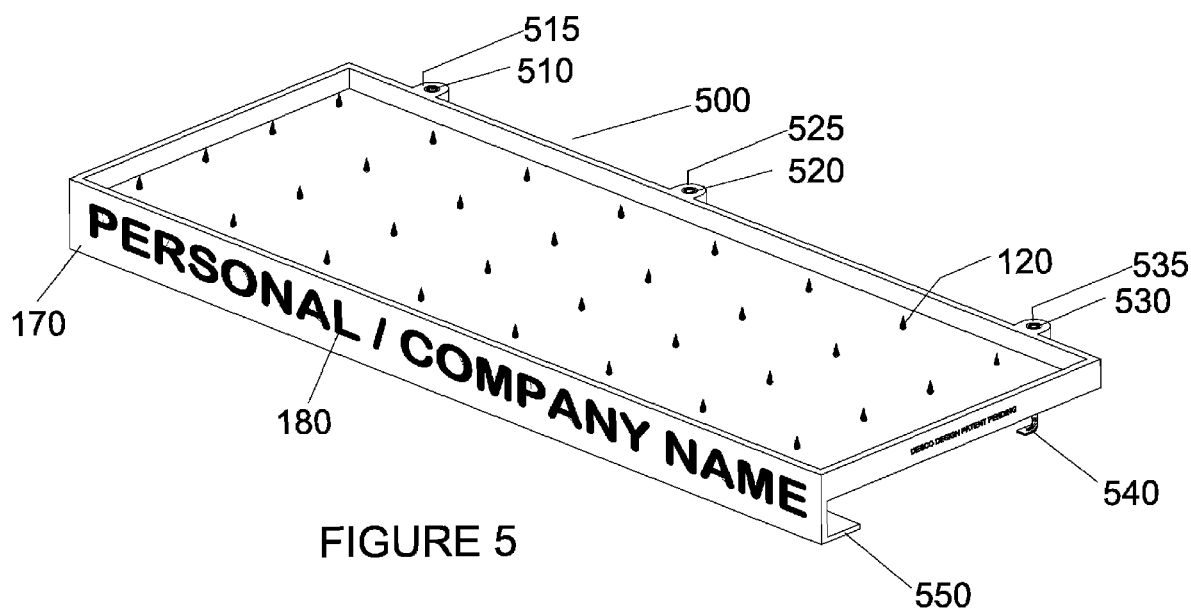
FIG. 5 conceptually illustrates an alternative adjustable footwear cleaning apparatus with vertical screw assemblies for securing the apparatus according to principles of the invention.
Figure 6:
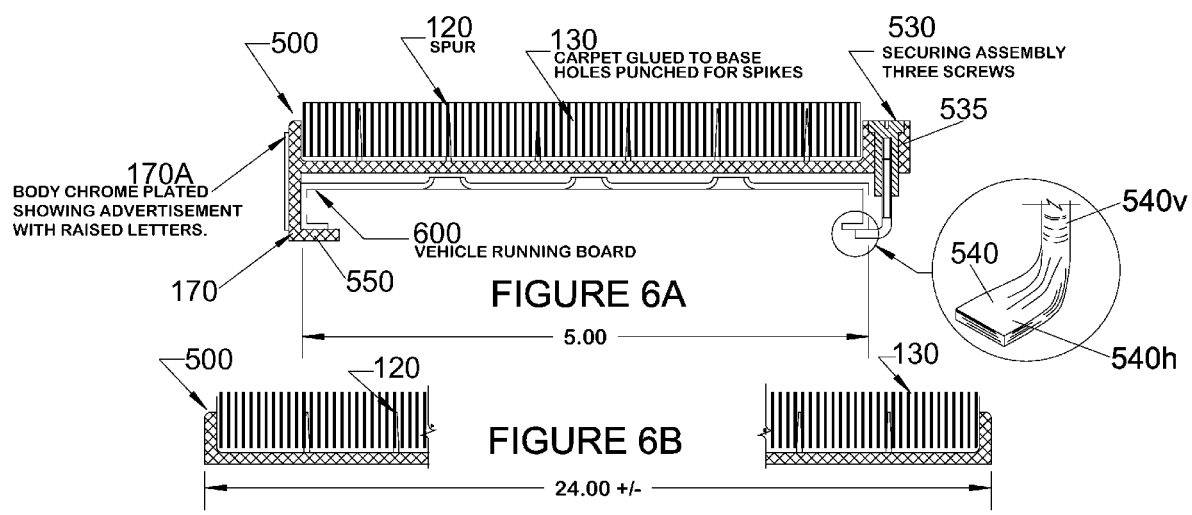
FIGS. 6A and 6B conceptually illustrate a base of an adjustable footwear cleaning apparatus with vertical screw assemblies for securing the apparatus according to principles of the invention.

Referring now to FIGS. 5, 6A and 6B an alternative adjustable footwear cleaning apparatus with vertical oriented clamping assemblies 515, 525 and 535 is shown. A plurality of vertically oriented clamping assemblies 515, 525 and 535 are disposed along one or more edges of the base 500. Each vertically oriented clamp 515, 525 and 535 includes a threadedly adjustable clamping member 540 with a vertical segment 540v and a horizontal segment 540h. An adjustment screw 510, 520, 530 threadedly engages the vertical segment 540v of each clamping member 540. Rotation of the adjustment screw 510, 520, 530 causes vertical adjustment of the corresponding clamping member 540, with the clamping member 540 extending or retracting into the corresponding assembly depending upon the threading and diction of rotation. A screw driver or other tool may be used to engage and rotate the adjustment screw 510, 520, 530.

In use, the apparatus is a placed on a running board or step 600 such that the front edge of the running board or step is engaged between the flange 550 of the front edge 170 and the base 500. Then one or more other edges of the running board or step are engaged between each clamping member 540 and base 500. Retraction of the clamping member 540 causes the horizontal segment 540v to move towards the base 500. Extension of the clamping member 540 causes the horizontal segment 540v to travel away from the base 500. The apparatus is secured to a running board (or step) by clamping one or more edges of a running board (or step) between the horizontal segment 540h of a clamping member 540 and the base 500. The apparatus is released from a running board (or step) by extending the clamping member 540, thereby causing the horizontal segment 540h to move away from the base 500, releasing the edges of a running board (or step) between the horizontal segment 540h of a clamping member 540 and the base 500.

Figure 7:
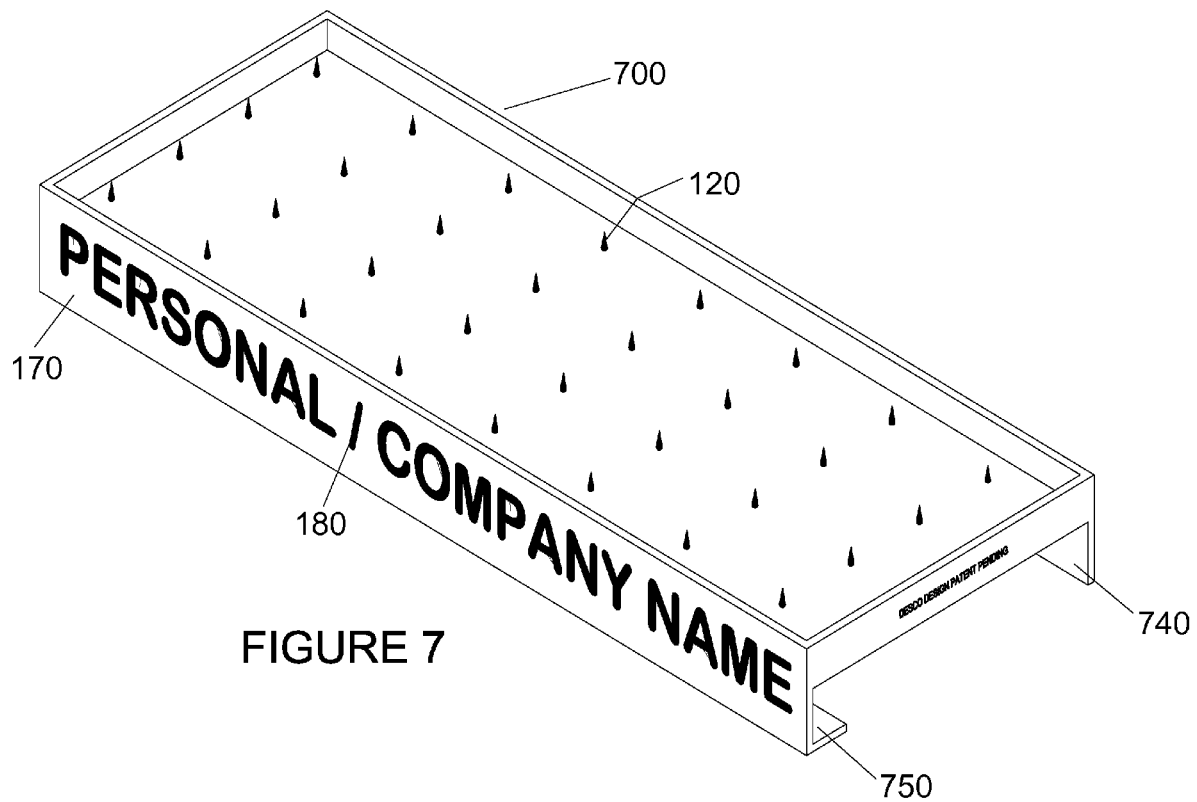
FIG. 7 conceptually illustrates an alternative adjustable footwear cleaning apparatus with horizontal screw assemblies for securing the apparatus according to principles of the invention.

Referring now to FIGS. 7, 8A and 8B another alternative adjustable footwear cleaning apparatus with horizontally oriented clamping assemblies 810 is shown. A plurality of horizontally oriented clamping assemblies 810 are disposed along one or more edges of the base 700. Each horizontally oriented clamp 810 includes a threadedly adjustable screw 810 engaged by a threaded opening in the back downwardly extending edge 740 of the base. Rotation of the adjustable screw 810 causes horizontal adjustment of the screw 810. A screw driver or other tool such as a screw tightening rod 820 may be used to engage and rotate the adjustment screw 810.

In use, the apparatus is a placed on a running board or step such that the front edge of the running board or step 800 is engaged between the flange 750 of the front edge 170 and the base 700. Then one or more other edges of the running board or step 800 are engaged by each horizontal clamping member 810. Retraction of the clamping member 810 releases the running board or step 800. Extension of the clamping member 810 engages the running board or step 800. The apparatus is secured to a running board (or step) by clamping edges of a running board (or step) 800 between the front edge 170 and the horizontally oriented clamp 810. The apparatus is released from a running board (or step) 800 by retracting the clamping member 810, thereby causing the screw 810 to move away from the engaged running board (or step) 800.

Optionally, a decorative face plate 170A may be bonded or otherwise fastened to the outer exposed surface 170 of the base 100, as shown in FIGS. 6A and 8A. The face plate 170A may be a thin metallic panel that can be made from stainless steel or other suitable metal or alloy. Alternatively, the face plate 170A can be made from a plastic material. The face plate 170A is plated or otherwise finished to provide a decorative finish for the apparatus. Conventional plating materials can be used such as an undercoating of nickel and a surface or finish coating of chrome.

While the invention has been described in terms of various embodiments, implementations and examples, those skilled in the art will recognize that the invention can be practiced with modification within the spirit and scope of the appended claims including equivalents thereof. The foregoing is not intended to limit the invention to the exact construction and operation shown and described. Alternative embodiments of the invention, including variations in size, materials, components, shape, form, function, manner of operation, assembly and use that are obvious to one skilled in the art are intended to be encompassed by the invention. Accordingly, all suitable modifications and equivalents may be resorted to, falling within the scope of the invention.

What is claimed is:

1. An adjustable footwear cleaning apparatus comprising a planar base having a top surface, a plurality of spikes having free ends protruding from the top surface of the base, a carpet sized to fit on the base, said carpet being attached to the base, said plurality of spikes protruding into the carpet, and means for attaching the base to a substrate; wherein the means for attaching the base to a substrate comprise a plurality of straps adapted to adjustably secure the base to the substrate, and said apparatus further comprises a plurality channels in the base adapted to receive segments of the straps.

2. An adjustable footwear cleaning apparatus according to claim 1, wherein the substrate is a running board of a vehicle.

3. An adjustable footwear cleaning apparatus according to claim 1, wherein the substrate is a step.

4. An adjustable footwear cleaning apparatus according to claim 1, wherein the plurality of straps include hook and loop fastening elements adapted to adjustably secure the base to the substrate.

5. An adjustable footwear cleaning apparatus according to claim 1, wherein the planar base comprises a rectangular panel with raised edges adapted to form a compartment for receiving the carpet.

6. An adjustable footwear cleaning apparatus comprising a planar base having a top surface, a plurality of spikes having free ends protruding from the top surface of the planar base, a carpet sized to fit on the planar base, said carpet being attached to the base, said plurality of spikes protruding into the carpet, and means for attaching the base to a substrate, wherein the planar base comprises a rectangular panel with raised edges adapted to form a compartment for receiving the carpet, the means for attaching the base to a substrate comprise a plurality of straps adapted to adjustably secure the base to the substrate, and said apparatus further comprises a plurality channels in the base adapted to receive segments of the straps, and said raised edges includes slots in alignment with the channels adapted to allow the straps to pass through a slot in a first raised edge, a channel in the base and a slot in a raised edge opposite the first raised edge.

7. An adjustable footwear cleaning apparatus according to claim 6, wherein the planar base comprises a rectangular panel with raised edges adapted to form a compartment for receiving the carpet, an indicia being displayed on at least one raised edge.

8. An adjustable footwear cleaning apparatus according to claim 6, wherein the base is comprised of a material from the group consisting of aluminum, magnesium, steel, aluminum alloys, magnesium alloys and steel alloys.

9. An adjustable footwear cleaning apparatus according to claim 6, wherein the base is comprised of a plastic material.

10. An adjustable footwear cleaning apparatus according to claim 9, wherein the plastic material includes an effective amount of an additive from the group consisting of a thermochromic agent, a photochromic agent, and a phosphorescent agent.

11. An adjustable footwear cleaning apparatus according to claim 6, wherein the base is comprised of a material from the group consisting of polyvinyl chloride, polyethylene, polypropylene, polystyrene, acrylic, cellulosics, acrylonitrile-butadjene-styrene terpolymers, a urethane, thermo-plastic resins, a thermo-plastic elastomer, an acetal resin, a polyamide, a polycarbonate and a polyester.

12. An adjustable footwear cleaning apparatus according to claim 6, wherein the carpet includes a plurality of perforations to allow passage of the free ends of the spikes.

13. An adjustable footwear cleaning apparatus comprising a planar base having a top surface, a plurality of spikes having free ends protruding from the top surface of the base, a carpet sized to fit on the base, said carpet being attached to the base, said plurality of spikes protruding into the carpet, and means for attaching the base to a substrate, wherein the substrate is a running board of a vehicle, the planar base comprises a rectangular panel with raised edges adapted to form a compartment for receiving the carpet, the means for attaching the base to a substrate comprise a plurality of straps adapted to adjustably secure the base to the substrate, and said apparatus further comprises a plurality channels in the base adapted to receive segments of the straps, and said raised edges includes slots in alignment with the channels adapted to allow the straps to pass through a slot in a first raised edge, a channel in the base and a slot in a raised edge opposite the first raised edge, and an indicia displayed on at least one raised edge.

* * * * *